(12) United States Patent
Fukuda et al.

(10) Patent No.: US 6,931,215 B1
(45) Date of Patent: Aug. 16, 2005

(54) OPTICAL TRANSMITTER MODULE

(75) Inventors: Kazuyuki Fukuda, Chiyoda (JP);
Hideyuki Kuwano, Yokohama (JP);
Yoshitaka Fujiwara, Yokohama (JP);
Makoto Shimaoka, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 09/654,087

(22) Filed: Sep. 1, 2000

(30) Foreign Application Priority Data

Jun. 26, 2000 (JP) .............................. 2000-196271

(51) Int. Cl.⁷ .......................... H04B 10/04; H01S 3/04
(52) U.S. Cl. .................... 398/201; 398/182; 398/192; 398/197; 372/34; 372/35
(58) Field of Search ................. 398/182, 192, 398/197, 201; 372/34, 35, 36

(56) References Cited

U.S. PATENT DOCUMENTS

| 4,137,060 A | * | 1/1979 | Timmermann | .................. 65/31 |
| 4,615,031 A | * | 9/1986 | Eales et al. | .................... 372/36 |
| 4,767,171 A | * | 8/1988 | Keil et al. | ...................... 385/35 |
| 4,803,689 A | * | 2/1989 | Shibanuma | .................... 372/36 |
| 5,049,429 A | * | 9/1991 | Shibukawa et al. | ............ 428/68 |
| 5,478,371 A | * | 12/1995 | Lemaire et al. | ................ 65/384 |
| 5,960,142 A | * | 9/1999 | Shimizu | ....................... 385/92 |
| 6,108,359 A | * | 8/2000 | Tatsuta | ......................... 372/36 |

FOREIGN PATENT DOCUMENTS

| EP | 0 501 571 A1 | * | 2/1992 | ............ G02B 6/42 |
| JP | 08-015644 | | 1/1996 | |
| JP | 8-15644 | * | 1/1996 | |
| JP | 11-295560 | * | 10/1999 | |
| JP | 2000-121886 | | 4/2000 | |
| JP | 2000-121889 | | 4/2000 | |

OTHER PUBLICATIONS

Kowalski et al., "Laser Weld Process Improvements for Optical Isolator Assembly", Proceedings of the Electronic Components and Technology Conference. Las Vegas, May 21-24, 1995, *IEEE, US*, vol. CONF. 45, pp. 1116-1121, XP000625004.

Van Tongeren et al., "Packaging of Fibre-Optic Communication Lasers for the Gb/s Range", Electronic Components and Technology Conference, 1991. Proceedings., Atlanta, May 11-16, 1991, *IEEE, US*, pp. 147-149, XP010044374.

* cited by examiner

*Primary Examiner*—M. R. Sedighian
(74) *Attorney, Agent, or Firm*—Antonelli, Terry, Stout & Kraus, LLP

(57) ABSTRACT

A smaller and higher performance optical transmitter module is provided, which can improve the reliability and which can be manufactured at lower costs and allow for stable laser transmission of an optical semiconductor element. The optical transmitter module which has an optical semiconductor element, an optical fiber optically coupled to the optical semiconductor element, an inline optical isolator provided for the optical fiber, and a package case containing the optical semiconductor element and the optical fiber, includes a substrate member with one end of the optical fiber on the light incident side fixed thereon to be optically coupled to the optical semiconductor element, a thermoelectric cooler with the substrate member joined to the top surface thereof, and a pipe-like support member projecting from the side face of the package case for fixing the optical isolator.

12 Claims, 2 Drawing Sheets

OPTICAL TRANSMITTER MODULE

BACKGROUND OF THE INVENTION

The present invention relates to an optical transmitter module for use in optical fiber transmission systems which transmit optical signals, and in particular, to an optical transmitter module which optically couples an optical semiconductor element to an optical fiber.

RELATED ART

Conventionally, in order to control the temperature of a semiconductor laser element from outside of the package and to miniaturize the optical transmitter module, it has been well known that the semiconductor laser element (optical semiconductor element) and an optical fiber are mounted and fixed on a base provided on a Peltier cooler (thermoelectric cooler) so that they are optically coupled to each other, that an optical branching device which divides input/output signal lights from the optical fiber to a receiving light receptor element is inserted in the middle of the optical fiber, and that a small inline isolator is further provided between the semiconductor laser element and the receiving light receptor element. That is described, for example, in JP-A-11-295560.

Further, in order to provide a smaller and high performance optical transmitter module, a core enlargement fiber is tightly connected to each end of an optical isolator and the core enlargement fiber connected to a semiconductor laser element has a spherical end. That is disclosed in JP-A-8-15644.

SUMMARY OF THE INVENTION

According to the above-mentioned related arts, the optical transmitter module described in JP-A-11-295560 has the disadvantages that the heat capacity of an object which is subject to temperature control through the Peltier cooler may be increased, so that the heat generated by the semiconductor laser element cannot be efficiently removed and the semiconductor laser element cannot provide any stable laser transmission. Additionally, the inline isolator has an outside diameter φ of at least about 3.0 mm, which will make it difficult to reduce the height of the optical transmitter module.

Moreover, in the device described in JP-A-8-15644, an ordinary fine fiber with an outside diameter φ of 125 μm is directly bonded to a polarizer of the optical isolator and positioned to allow for optical coupling between the optical fibers at both ends. Thus, this device may be very difficult to assemble and require some attention in handling it after the connection has been made.

It is an object of the present invention to provide an optical transmitter module which can solve the problems of those related arts described above and which can improve the reliability by allowing for stable optical coupling between an optical semiconductor element and an optical fiber. In addition, the present optical transmitter module is smaller and has higher performance than ever because it can be manufactured at lower costs and allow for stable laser transmission of the optical semiconductor element.

To evaluate the problems described above, according to the present invention, an optical transmitter module has an optical semiconductor element, an optical fiber optically coupled to the optical semiconductor element, an inline optical isolator provided in the optical fiber, and a package case containing the optical semiconductor element and the optical fiber, and the optical transmitter module comprises a substrate member fixing one end of the optical fiber on the light incident side to optically couple to the optical semiconductor element with it, a thermoelectric cooler joined the substrate member to the top surface thereof, and a pipe-like support member projecting from the side face of the package case for fixing the optical isolator.

Thereby, in the load imposed on the thermoelectric cooler, the heat capacity can be reduced without any need for taking the optical isolator into account and thus, the heat generated by the semiconductor laser element can be efficiently removed and the semiconductor laser element can provide a stable laser operation. The present optical transmitter module can be reduced in both size and height because the optical isolator is fixed on the side face of the package case without stacking any thermoelectric cooler, the substrate member, and the optical isolator on the top of each other. In addition, since the end of the optical fiber is fixed to optically couple to the optical semiconductor element which is on the substrate member, the present optical transmitter module can allow for easy alignment and reduce possible losses, thereby improving the reliability and making it smaller at lower costs.

In the present embodiment described above, it is preferable that the end of the optical fiber on the light inlet side is spherical or hemispheric in shape.

It is preferable that the length of the optical fiber from the optical isolator to the point where it is fixed to optically couple with the optical semiconductor element is 15 to 25 mm.

It is preferable that the optical isolator and the support member are fixed to each other through laser welding or brazing.

In another embodiment according to the present invention, one end of an optical fiber is bonded to the top surface of a substrate member and then an optical isolator is welded to a pipe-like support member provided on the side face of a package case.

Therefore, alignment for maximum light output can be accomplished by first bonding the end of the optical fiber to the top surface of the substrate member, thereby making the joining of the optical isolator easier. Also, the optical isolator can be rotationally adjusted, thereby enabling the use of a polarization-dependent optical isolator.

In still another embodiment according to the present invention, a substrate member and an optical semiconductor element are provided on the top surface of a thermoelectric cooler and an optical isolator is fixed to a support member provided on the side face of a package case.

In the embodiment described above, it is preferable that a signal light passing through the optical isolator is a substantially collimated light or a substantially converged light.

PREFERRED EMBODIMENTS OF THE INVENTION

Figure 1:
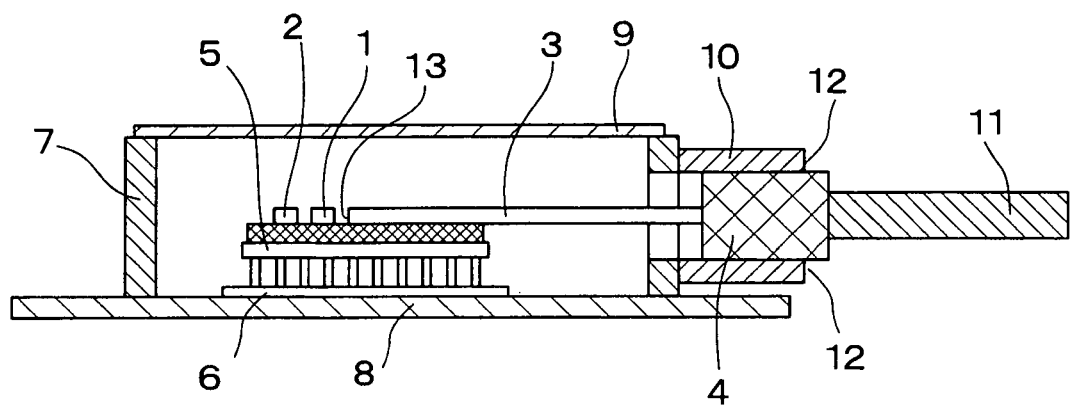
FIG. 1 is a longitudinal sectional view of an optical transmitter module according to an embodiment of the present invention.

Now, the embodiments of the present invention will be described below in detail with reference to FIGS. 1 through 4. In the drawings, some parts or bonding/fixation members are appropriately omitted to avoid any complexity of the drawings.

FIG. 1 shows a longitudinal sectional view of an optical transmitter module according to an embodiment of the present invention and the optical transmitter module has a laser diode 1 serving as a semiconductor light emitting element, a monitor photodiode 2 serving as a semiconductor light receptor element, a stem substrate (substrate member) 5 on which these semiconductor light emitting/receptor elements 1, 2 are mounted, a Peltier cooler 6 serving as a thermoelectric cooler with the stem substrate 5 mounted on the top surface thereof, an optical fiber 3 optically coupled to the laser diode 1 and the photodiode 2 for internally transmitting a laser light, and an inline optical isolator 4 provided between the optical fibers 3.

The stem substrate 5 is provided with a V-shaped groove (not shown) for running the optical fiber 3 therethrough, an adhesive for bonding the optical fiber 3 in the V-shaped groove, and a metallized pattern and a wire bonding for electrically connecting the laser diode 1 and the photodiode 2 to any external device.

In addition, a package case 7 contains the stem substrate 5 and the Peltier cooler 6 and further comprises a cap 9 for protecting the inside of the package case 7 from the external environment and a pipe-like support member 10 formed on the side face for supportably fixing the optical isolator 4. Optical coupling between the laser diode 1 and the optical fiber 3 is directly accomplished.

The package case 7 comprises a box-shaped metal frame as an outer frame and a ceramic terminal table (both not shown), and a base 8. The ceramic terminal table has seven lead terminals on each side and hence fourteen lead terminals in total. The cap 9 is joined to the top surface of the package case 7 through resistance welding and the optical isolator 4 is joined to the pipe-like support member 10 on the side face of the case 7 through a laser welding joint 12, so that the package case 7 can be airtightly sealed.

The base 8 has threaded holes formed in its portion projecting from the frame and the optical transmitter module is attached to a heat sink or radiative fin with screws in the threaded holes.

The dimensions of the package case 7 are such that, for example, the height (in the vertical direction in FIG. 1) is 6.5 mm, the width (in the direction perpendicular to the drawing paper of FIG. 1) is 12.7 mm, and the length (in the horizontal direction in FIG. 1) is 21.0 mm, and the lead terminals are provided at intervals of 2.54 mm. The thickness of the base 8 is 1.0 mm.

The stem substrate 5 is made of silicon single crystal and the laser diode 1, the photodiode 2, the optical fiber 3, and a thermistor chip for temperature detection (not shown) are mounted on the top surface of the stem substrate 5. The optical fiber 3 is provided in the V-shaped groove formed in the stem substrate 5 through anisotropic etching and then fixed therein with an adhesive. The laser diode 1 and the photodiode 2 are mounted according to alignment markers made in the V-shaped groove in the stem substrate 5, so that the laser diode 1 and the photodiode 2 can be aligned with the optical fiber 3 in a simplified manner.

The thermistor chip senses any heat generated when the laser diode 1 is driven, and controls the Peltier cooler 6 so that the laser diode 1 is at a proper temperature.

The pipe-like support member 10 has been previously fixed to the side face of the package case 7 using silver brazing and the optical isolator 4 is inserted into the support member 10 and fixed therein with the laser welding point 12.

The optical isolator 4 is of inline type which has the optical fibers 3 on both ends, and the optical fiber 3 on the light incident side which is provided within the package case 7 is a bare one and the optical fiber 3 on the light outgoing side which is provided outside the case 7 is covered with a coating 11. The end 13 of the optical fiber on the light incident side which faces the laser diode 1 is spherical in shape in order to prevent any laser light emitted from the laser diode 1 from being reflected from the end 13 of the optical fiber back into the laser diode 1 as well as to reduce any loss in optical coupling with the laser diode 1 by affording lens effects to it.

It should be appreciated, however, that the present invention is not limited to a spherical end and, for example, a hemispherical end or another type of spherical end which is afforded lens effects only at the core section through etching or still another type of end which is covered with a reflective coating may be used as well.

In order to transmit a laser light from the optical fiber 3 on the light incident side to the optical fiber 3 on the light outgoing side with lower losses, the optical isolator 4 comprises a lens coupled system which provides a substantially collimated light or a substantially converged light therebetween. Polarizers 16, 18, a Faraday rotator 17, and a magnet 19 which are internal optical parts in the optical isolator 4, are provided within such an optical space portion that a substantially collimated light or a substantially converged light is obtained.

The dimensions of the inline optical isolator 4 are such that, for example, the outside diameter $\phi$ is 3.5 mm and the length (the horizontal direction in FIG. 1) is 6.0 mm, and the length of the optical fiber 3 on the light incident side which extends from the optical isolator 4 is approximately 20 mm. Therefore, assuming that the optical fiber 3 is a single-mode optical fiber and that the optical isolator 4 is of polarization-insensitive type, the amount of return loss will be 30 dB or more.

Now, how to assemble the present optical transmitter module will be described below. First, the laser diode 1 and the photodiode 2 are joined to each other according to the alignment markers provided in the stem substrate 5 and the stem substrate 5 is joined to the top surface of the Peltier cooler 6. Next, the bottom surface of the Peltier cooler 6 is positioned on the base 8 of the package case 7 to join them in proper alignment with each other. Then, the optical isolator 4 is inserted into the pipe-like support member 10 on the side face of the package case 7 to locate the end 13 of the optical fiber on the top surface of the stem substrate 5 and the optical isolator 4 in the pipe-like support member 10, respectively.

The optical fiber 3 on the top surface of the stem substrate 5 runs through the V-shaped groove previously formed through anisotropic etching. Then the distance between the end 13 of the optical fiber and the laser diode 1 is adjusted and the optical fiber 3 is pressed against the V-shaped groove to bond it with an adhesive. Subsequently, the optical isolator 4 is joined to the pipe-like support member 10 with the laser welding point 12. At this point, the optical isolator 4 must be fixed, taking care that no external force is applied to the optical fiber 3 on the stem substrate side. For this purpose, the laser welding joint 12 is welded on its whole perimeter by gradually increasing spot-welded points. Then, to seal the package case 7 airtightly, a baking process is accomplished to completely react the adhesive for fixing the optical fiber 3 on the stem substrate 5. Finally, the inside of the package case 7 is filled with nitrogen atmosphere or dry air and a cap 9 is resistance-welded to airtightly seal the case. This completes the assembly operation.

The heat capacity, which is subject to temperature control by the Peltier cooler 6, can be reduced by providing the optical fiber 3 on the light incident side of the optical isolator 4 on the top surface of the stem substrate 5 and then fixing the optical isolator 4 to the pipe-like support member 10 on the side face of the package case 7 so that the optical fiber 3 is optically coupled to the laser diode 1. Thus, any heat generated by the laser diode 1 can be diffused efficiently to allow for stable laser transmission of the laser diode 1.

In addition, any optical passage loss can be reduced by providing a substantially collimated light or a substantially converged light as a signal light which passes through the optical isolator 4 from the optical fiber 3 on the light incident side to the optical fiber 3 on the light outgoing side, and the efficiency in optically coupling with the laser diode 1 can be further increased by using a spherical, cuneal, etched, or coated end as the end 13 of the optical fiber 3 on the light incident side.

Since the inline optical isolator 4 with the optical fiber 3 on the light incident side dimensioned to have a predetermined length is mounted in the package case 7, any external force which may be generated from thermal deformation of the package case 7 or the base 8 can be absorbed by having the optical fiber 3 itself bent under the external force. Thus, the optical fiber 3 can be stably assembled to the top surface of the stem substrate 5. If the optical fiber 3 is too short, it cannot accommodate such deformation satisfactorily or it may be difficult to manufacture. If the optical fiber 3 is too long, the resulting optical transmitter module will be too large for a desired use. That is, it is preferable that the optical fiber 3 has a length of about 20 mm and more practically, a length within the range from 15 to 25 mm. It should be appreciated that a length of 15 mm is the lower limit for a practical optical fiber which can absorb any external force generated from thermal deformation and can be manufactured appropriately and a length of 25 mm is the upper limit which can avoid a larger optical transmitter module.

Moreover, the assembly operation described above can be simplified by mounting the inline isolator 4 in the package case 7. Also, it is very useful in providing a smaller optical transmitter module and in particular, a thinner one that the optical isolator 4 is attached to the side face of the package case 7.

Figure 2:
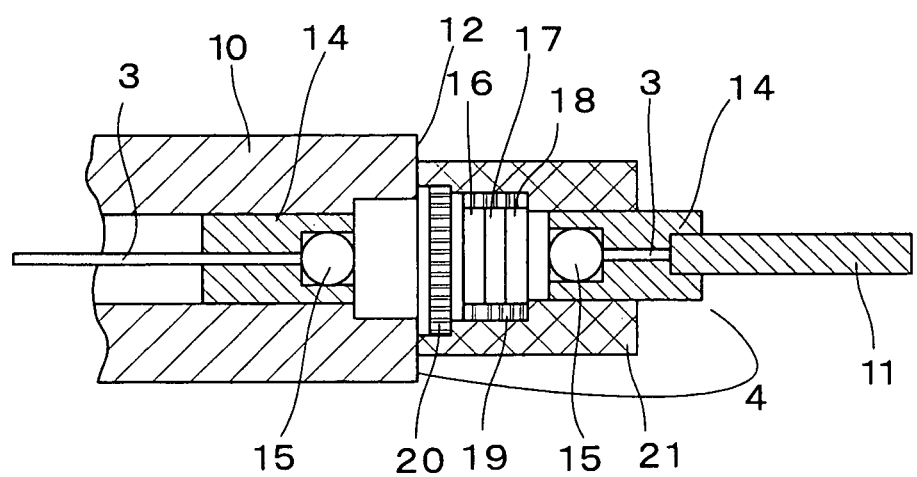
FIG. 2 is a longitudinal sectional view of an optical isolator section in FIG. 1.

Next, FIG. 2 shows the joint for an optical isolator 4 according to another embodiment of the present invention. FIG. 2 differs from FIG. 1 in that an optical fiber 3 on the light incident side is divided into one for an optical isolator 4 and the optical fiber 3 on the light outgoing side.

The ends of the optical fibers 3 on the light incident side, one of which faces a laser diode 1 and the other of which is located on the opposite side, have a lens 15, respectively. The lens 15 and the optical fiber 3 are fixed with a fiber support member 14 to connect their optical paths. In addition, an optical fiber 3 connected to the fiber support member 14 is inserted into a pipe-like support member 10.

There are polarizers 16, 18, a Faraday rotator 17, and a magnet 19 provided within an isolator holder 21 as well as a glass plate 20 with a coating provided to airtightly seal a package case 7 and to prevent reflection, and there are also an optical fiber 3 and a lens 15 provided within the fiber support member 14. The isolator holder 21 is fixed on the end surface of the pipe-like support member 10 with a laser welding point 12 in such an alignment that a laser light can be received by an optical fiber 11 on the light outgoing side from the optical fiber 3 on the light incident side to maximize the light output.

The optical fiber 3 on the light incident side is inserted into the pipe-like support member 10 and fixed on the top surface of a stem substrate 5 with an adhesive to optically couple to the laser diode 1. Then the fiber support member 14 is fixed within the pipe-like support member 10. The fiber support member 14 is joined within the pipe-like support member 10 with no gap. A cap 9 is first attached to airtightly seal a package case 7 and then the isolator holder 21 is joined to the end surface of the pipe-like support member 10. Thus, this assembly operation will be easier than another operation wherein the cap 9 is attached through resistance welding with the optical fiber coating 11 previously provided, and this can prevent accidental contact with the laser diode 1 or the joint for the optical fiber 3 in the package case 7.

Alternatively, a polarization-dependent optical isolator 4 can be used since the polarization direction of an output laser light emitted from the optical fiber 3 on the light incident side can be adjusted for coincidence by rotating the optical isolator holder 21.

It should be appreciated that the glass plate 20 provided within the isolator holder 21 may be omitted by joining the isolator holder 21 and the fiber support member 14 with no gap for airtight sealing, by tilting the polarizers 16, 18 to prevent reflection, or by taking other appropriate measures.

Figure 3B:
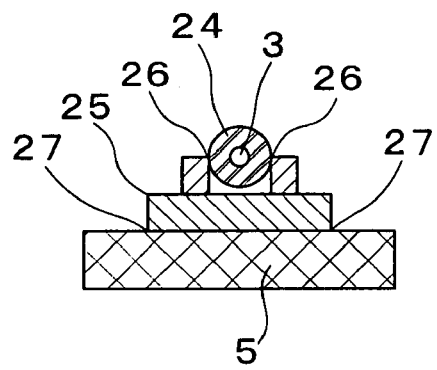
FIGS. 3A and 3B show a longitudinal sectional view of a joint for an optical fiber and a sectional view taken along a line a-a' in FIG. 3A.
Figure 3A:
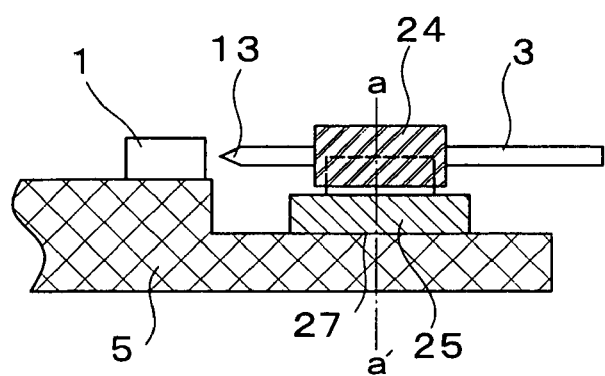

FIGS. 3A and 3B show another embodiment of the present invention. Specifically, FIG. 3A shows a longitudinal sectional view of the joint for an optical fiber 3 and FIG. 3B is a sectional view taken along a line a-a' in FIG. 3A.

The embodiment in FIGS. 3A and 3B differs from that in FIG. 1 in that a guide 24 is provided near the end of the optical fiber 3 on the light incident side and fixed on a stem substrate 5 through a fiber support table 25 to align a laser diode 1 with the optical fiber 3 in the triaxial direction. The guide 24 and the fiber support table 25 provided near the end of the optical fiber 3 are made of metal and the stem substrate 5 in the embodiment is also made of metal. The surface of the optical fiber 3 is metallized and the guide 24 is joined to that surface with a brazing material such as solder. The fiber support table 25 has an angulated groove formed therein and the guide 24 is fixed in the angulated groove with laser welding points 26 in such an alignment that the laser diode 1 and the optical fiber 3 can be optically coupled.

Similarly, the fiber supper member 25 can be also joined to the stem substrate 5 with laser welding points 27 in such an alignment that the laser diode 1 and the optical fiber 3 can be optically coupled. The optical fiber 3 used herein has an end 13 shaped to be cuneal. Such an optical fiber is especially suitable for optically coupling with a pumping laser element used for optical amplification and thus, it can provide more accurate alignment for optically coupling between the laser element and the optical fiber 3.

In the above description, the guide 24, the fiber support table 25, and the stem substrate 5 have been described as being joined with the laser welding points 26, 27. It should be appreciated, however, that the present invention is not limited to this embodiment and a brazing material such as solder or low-melting glass or metal may be plastically deformed for joint fitting between them.

Now, still another embodiment of the present invention will be described below with reference to FIG. 4.

Figure 4:
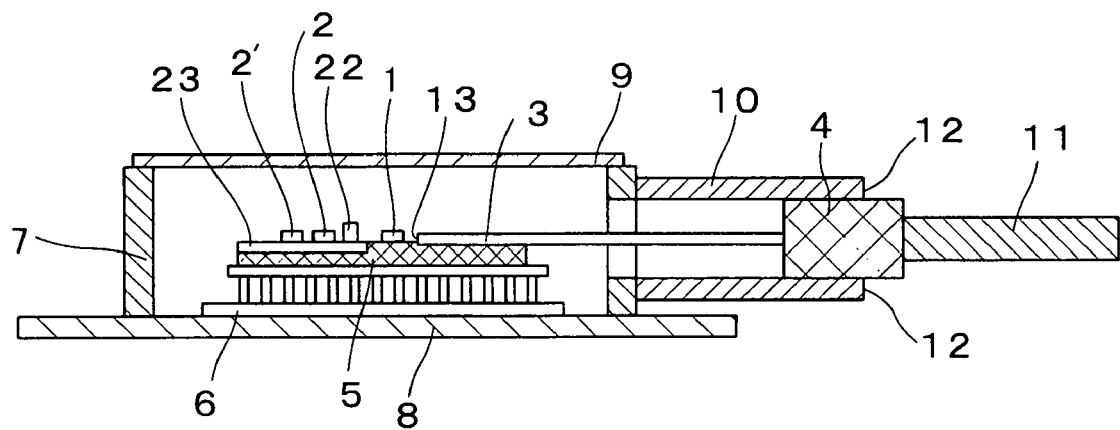
FIG. 4 is a longitudinal sectional view according to another embodiment of the present invention.

The embodiment in FIG. 4 differs from that in FIG. 1 in that a filter substrate 23 having a plurality of photodiodes 2, 2' and an optical branching filter 22 mounted thereon is attached to the top surface of a stem substrate 5. On the top surface of the filter substrate 23, the optical branching filter 22 and the plurality of photodiodes 2, 2' are provided in place to receive a backward light emitted from a laser diode 1 (i.e., a laser light emitted from the side opposite to an optical fiber 3). The filter substrate 23 is joined to a step section provided on the top surface of the stem substrate 5 in such an alignment as to optically couple to the backward light emitted from the laser diode 1. The optical branching filter 22 branches the backward light emitted from the laser diode 1 to the two photodiodes 2, 2' so that a more stable laser light can be emitted from the laser diode 1. For example, this can allow for a more stable light output or wavelength of the laser light emitted from the laser diode 1.

In the optical transmitter module with the filter substrate 23 mounted on the stem substrate 5 as described above, a pipe-like support member 10 longer than that in the optical transmitter module shown in FIG. 1 is provided to mount an inline optical isolator 4 because the laser diode 1 is provided near the center of a package case 7. In this case, a slight modification to the pipe-like support member 10 may suffice, and joining the inline optical isolator 4 to the optical fiber 3 and a welding joint 12 for the optical isolator 4 can be accomplished in a similar manner to those for FIG. 1. Therefore, this may be applicable as a common technique to several types of optical transmitter modules selected for various usages.

In the above-mentioned embodiments, the optical transmitter modules have been described as having both the laser diode 1 and the photodiode 2. It should be appreciated, however, that the present invention may be applicable to an optical transmitter module which has either of them.

In addition, the optical fiber 3 on the light incident side has been described as having a predetermined length to absorb any external force generated from thermal deformation of the package case 7 or the base 8. It should be preferable, however, that the optical fiber 3 has been previously bent with a step of about 0.1 to 0.5 mm which is provided between the point where the optical fiber 3 is bonded to the stem substrate 5 and the central location where the optical isolator 4 is fixed to the pipe-like support member 10. This can allow for more reliable absorption of external forces and stable fixation of the optical fiber 3.

According to the present invention, any load imposed on the thermoelectric cooler can be reduced to yield a thinner and smaller one, thereby improving the reliability and providing a smaller and higher performance optical transmitter module.

What is claimed is:

1. An optical transmitter module comprising:
an optical semiconductor element;
an inline optical isolator member comprising an optical isolator, a first optical fiber disposed on a side face of said optical isolator and facing to said optical semiconductor element, and a second optical fiber disposed on another side of said optical isolator and communicating to outside;
a package case containing said optical semiconductor element;
a thermoelectric cooler provided in said package case;
a substrate member mounted on the thermoelectric cooler, in said package case; and
a pipe-like support member projecting from a side face of said package case,
wherein said inline optical isolator member is introduced from said pipe-like support member into said package case,
wherein said first optical fiber is fixed at a distal end to said substrate member so as to optically couple to said optical semiconductor element, and
wherein said optical isolator has an area fixed in said pipe-like support member, said area being jointed on its whole perimeter to a distal end of said pipe-like support member so as to be fixed to said pipe-like support member.

2. The optical transmitter module according to claim 1, wherein the end of said first optical fiber on the light incident side is spherical or cuneal in shape.

3. The optical transmitter module according to claim 1, wherein the length of said first optical fiber from said optical isolator to the point at which said optical fiber is fixed to optically couple to said optical semiconductor element is 15 to 25 mm.

4. The optical transmitter module according to claim 1, wherein said optical isolator is fixed to said pipe-like support member through laser welding or brazing.

5. The optical transmitter module according to claim 1, wherein a signal light passing though said optical isolator is a substantially collimated light or a substantially converged light.

6. The optical transmitter module according to claim 1, wherein said first optical fiber positioned between said optical isolator and said pipe-like support member is arranged in a bent state.

7. An optical transmitter module, comprising:
a package case comprising a pipe-like support member projecting from a side face thereof;
a thermoelectric cooler positioned inside the package case;
a substrate mounted on the thermoelectric cooler inside the package case;
an optical semiconductor element disposed on the substrate;
an inline optical isolator member comprising an optical isolator, a first optical fiber disposed on one side of the optical isolator facing the optical semiconductor element, and a second optical fiber disposed on the other side of the optical isolator,
wherein the inline optical isolator member is introduced into the package case, from the pipe-like support member, via the side face of the package case, such that the first optical fiber is secured on the substrate and optically coupled to the optical semiconductor element; and
wherein the optical isolator is joined on its whole perimeter to the pipe-like support member at a distal end thereof so as to be fixed to the pipe-like support member.

8. The optical transmitter module according to claim 7, wherein the end of the first optical fiber on a light incident side is spherical or cuneal in shape.

9. The optical transmitter module according to claim 7, wherein the length of the first optical fiber from the optical isolator to the point at which the optical fiber is fixed to optically couple to the optical semiconductor element is 15 to 25 mm.

10. The optical transmitter module according to claim 7, wherein the first optical fiber positioned between the optical isolator and the pipe-like support member is arranged in a bent state.

11. A method of manufacturing an optical transmitted module comprising the steps of:
   providing a package case comprising a pipe-like support member projecting from a side face thereof;
   disposing, in said package case, an optical semiconductor element, a substrate member mounting said optical semiconductor element and a thermoelectric cooler mounting said substrate member on a top surface,
   providing an inline optical isolator member comprising an optical isolator, a first optical fiber disposed on a side face of said optical isolator and facing to said optical semiconductor element, and a second optical fiber disposed on another side of said optical isolator and communicating to outside;
   introducing said inline optical isolator member from and through said pipe-like support member into said package case;
   fixing a distal end of said first optical fiber to said substrate member so as to optically couple to said optical semiconductor element; and
   after the above step, fixing said optical isolator in said pipe-like support member.

12. The method of manufacturing the optical transmitter module according to claim 11, wherein said optical isolator is jointed on its whole perimeter to a distal end of said pipe-like support member so as to be fixed to said pipe-like support member.

* * * * *